(12) United States Patent
Song

(10) Patent No.: US 6,961,100 B2
(45) Date of Patent: Nov. 1, 2005

(54) LIQUID CRYSTAL DISPLAY AND DRIVING DEVICE THEREOF

(75) Inventor: Jang-Kun Song, Seoul (KR)

(73) Assignee: Samsung Electronics Co. Ltd., Suwon (KR)

( * ) Notice: Subject to any disclaimer, the term of this patent is extended or adjusted under 35 U.S.C. 154(b) by 28 days.

(21) Appl. No.: 10/400,471

(22) Filed: Mar. 28, 2003

(65) Prior Publication Data

US 2003/0184685 A1 Oct. 2, 2003

(30) Foreign Application Priority Data

Mar. 28, 2002 (KR) .............................. 10-2002-0017007

(51) Int. Cl.[7] .............................................. G02F 1/1343
(52) U.S. Cl. ...................................... 349/38; 349/143
(58) Field of Search ............................ 349/38–39, 139, 349/143

(56) References Cited

U.S. PATENT DOCUMENTS 5,748,276 A * 5/1998 Uno et al. .................. 349/144
5,798,745 A * 8/1998 Steffensmeier ............... 345/92

\* cited by examiner

Primary Examiner—Dung T. Nguyen
(74) Attorney, Agent, or Firm—McGuireWoods LLP

(57) ABSTRACT

A liquid crystal display with multi cell gaps includes first and second panels facing each other, and a pixel electrode, a common electrode and a storage electrode formed at one of the first and the second panels. A liquid crystal capacity is formed between the pixel electrode and the common electrode where a liquid crystal material is interposed, and a storage capacity being formed between the pixel electrode and the storage electrode where an insulating layer is interposed. The storage capacity is differentiated depending upon the cell gaps. The gray voltages applied to the pixel electrode have positive and negative gray voltages. The reference value of the positive and the negative gray voltages is varied depending upon the grays. With this structure, flicker correction is uniformly made even in a liquid crystal display where the kick-back voltage is varied per the respective grays.

2 Claims, 15 Drawing Sheets

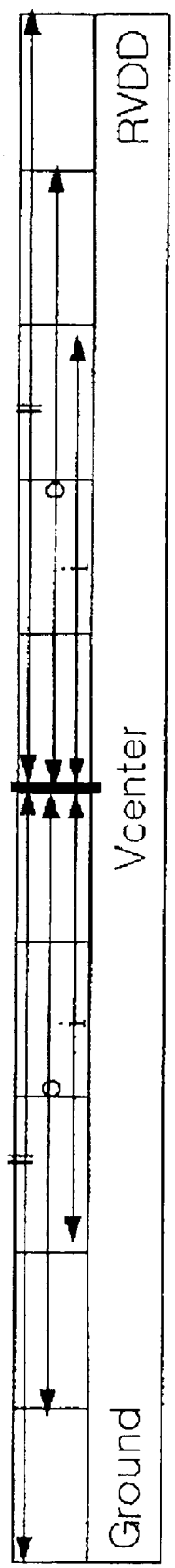

LIQUID CRYSTAL DISPLAY AND DRIVING DEVICE THEREOF

BACKGROUND OF THE INVENTION (a) Field of the Invention

The present invention relates to a liquid crystal display (referred to hereinafter simply as the "LCD") and, more particularly, to a flicker-free LCD and a device for driving the same.

(b) Description of the Related Art

Generally, a thin film transistor (TFT) LCD is a display device where an electric field is applied to a liquid crystal material injected between two panels with a property of dielectric anisotropy, and controlled in its strength while varying the light transmission through the panels, thereby displaying the desired picture image.

A plurality of gate lines are formed on the TFT-LCD panel while proceeding parallel to each other, and a plurality of data lines cross the gate lines in an insulating manner. Each region surrounded by the gate and the data lines makes formation of a pixel. A TFT is formed at the crossed area of the gate and the data lines within each pixel.

With the TFT-LCD, the TFT at each pixel is formed with a gate electrode, a source electrode and a drain electrode, which are connected to a gate line, a data line and a pixel electrode, respectively. A liquid crystal capacitor is formed between the pixel electrode and the common electrode. A storage capacitor is formed between the pixel electrode and the front gate line. A parasitic capacitance is made between the gate electrode and the drain electrode due to the misalignment thereof.

The operation of the TFT-LCD will be now explained in detail.

First, a gate-on voltage is applied to the gate electrode connected to the target gate line to turn on the TFT. Then, a data voltage expressing the picture image signal is applied to the source electrode, which in turn applies the data voltage to the drain electrode. Consequently, the data voltage is applied to the liquid crystal capacitor and the storage capacitor via the pixel electrode, and an electric field is formed due to the potential difference between the pixel electrode and the common electrode. When one-directional electric fields are continuously applied to the liquid crystal material, the liquid crystal material is liable to be deteriorated. In order to prevent deterioration of the liquid crystal material, with the driving of the LCD panel assembly, positive and negative picture image signals are alternately applied to the common electrode in a repeated manner. Such a driving technique is called the "inversion driving."

Meanwhile, in case the TFT turns on, the voltage applied to the liquid crystal capacitor and the storage capacitor should be maintained continuously even after the TFT turns off. However, due to the parasitic capacitance between the gate electrode and the drain electrode, the voltage applied to the pixel electrode suffers distortion. The distorted voltage is called the "kick-back voltage." The kick-back voltage ΔV can be obtained based on the mathematical formula 1.

$$\Delta V = (C_{gd}/(C_{gd}+C_{st}+C_{lc}))\Delta V_g \quad (1)$$

The ΔVg indicates the variation in the gate voltage (Vgon-Vgoff).

The voltage distortion is always made in the direction of lowering the voltage of the pixel electrode irrespective of the polarity of the data voltage.

With the ideal TFT-LCD, the data voltage is applied to the pixel electrode when the gate voltage turns on, and maintained at that state even when the gate voltage turns off. By contrast, with the practical TFT-LCD, the pixel voltage is influenced by the kick-back voltage ΔV, and lowered by the amount as much as the kick-back voltage at the area where the gate voltage is inverted.

Meanwhile, the effective value of the voltage applied to the liquid crystal is determined by the area between the pixel voltage and the common voltage. In case the LCD is driven by way of the inversion driving, it is necessary to control the common voltage level such that the areas of the pixel voltages with respect to the common voltage are symmetrical to each other. For this purpose, conventionally, a predetermined common voltage is applied to the common electrode such that the areas of the pixel voltages with respect to the common voltage are symmetrical to each other.

In case the areas of the pixel voltages with respect to the common voltage are not symmetrical to each other, the amount of the pixel voltages charged at the respective pixels is differentiated per the respective frames. As a result, a flicker phenomenon where the screen is flickered with the inversion of the pixel voltage occurs.

With the occurrence of the flicker phenomenon, serious problems such as increased fatigue stress applied to the user and generation of afterimages are made. Particularly with the multi-cell-gap structure where the RGB cell gaps differ from each other as well as with the case of the liquid crystal material bearing a high dielectric constant, the flicker phenomenon occurs more seriously.

With the multi-cell-gap structure, the liquid crystal capacity is differentiated depending upon the RGB cell gaps. Therefore, the kick-back voltages made at the respective pixels differ from each other by way of the mathematical formula 1. When it is established that the occurrence of the flicker phenomenon is reduced to a minimum with respect to a predetermined gray, other grays become to be free of the flicker.

With most of the LCDs, the liquid crystal capacity varies depending upon the grays, and hence, the kick-back voltage also varies depending upon the grays. Consequently, the occurrence of flickers cannot be corrected in a uniform manner.

SUMMARY OF THE INVENTION

It is an object of the present invention to provide an LCD which is free of the flicker over the entire screen area with different kick-back voltages at the respective grays.

This and other objects may be achieved by an LCD with the following features.

According to one aspect of the present invention, the LCD includes first and second panels facing each other, and a pixel electrode, a common electrode and a storage electrode formed at one of the first and the second panels. The LCD involves multi cell gaps. A liquid crystal capacity is formed between the pixel electrode and the common electrode where a liquid crystal material is interposed, and a storage capacity is formed between the pixel electrode and the storage electrode where an insulating layer is interposed. The storage capacity is differentiated depending upon the cell gaps.

The storage capacity of the pixel with a relatively small cell gap is established to be lower than the storage capacity of the pixel with a relatively large cell gap.

The sum of the liquid crystal capacity and the storage capacity is constantly maintained per the respective pixels.

According to another aspect of the present invention, the LCD includes a plurality of gate and data lines arranged in the column and row directions, and a plurality of pixels formed at the area defined by the crossing of the gate and the data lines each with a switching element connected to the gate and the data lines. A driving device for the LCD includes a scan driving unit supplying gate voltages to the gate lines, a data driving unit supplying relevant gray voltages to the data lines upon receipt of data signals, and a gray voltage generation unit generating a plurality of gray voltages and supplying the generated gray voltages to the data driving unit. The gray voltages have positive gray voltages and negative gray voltages, and the reference value of the positive and the negative gray voltages is varied depending upon the grays.

The gray voltage generation unit includes a first resistance row having a plurality of resistances serially connected to each other between a first voltage to be applied and a reference voltage to generate a plurality of positive gray voltages, a second resistance row having a plurality of resistances serially connected to each other between the reference voltage and a second voltage to be applied to generate a plurality of negative gray voltages, and a voltage control unit partitioning the first and the second voltages to generate a reference voltage and supplying the reference voltage to the first and the second resistance rows. The reference voltage is varied depending upon the grays.

Particularly, the reference voltage has a value of ((the first voltage+the second voltage)/2)+α.

The voltage control unit has two or more resistances serially connected to each other between the first and the second voltages, and all the resistances have different values.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein:

FIG. 9A illustrates the examples of gray voltage generation according to a prior art.

DETAILED DESCRIPTION OF THE PREFERRED EMBODIMENTS

Preferred embodiments of this invention will be explained with reference to the accompanying drawings.

An LCD according to a first preferred embodiment of the present invention involves a multi-cell-gap structure. The way of removing possible flickers with the LCD will be now explained in detail.

Figure 1:
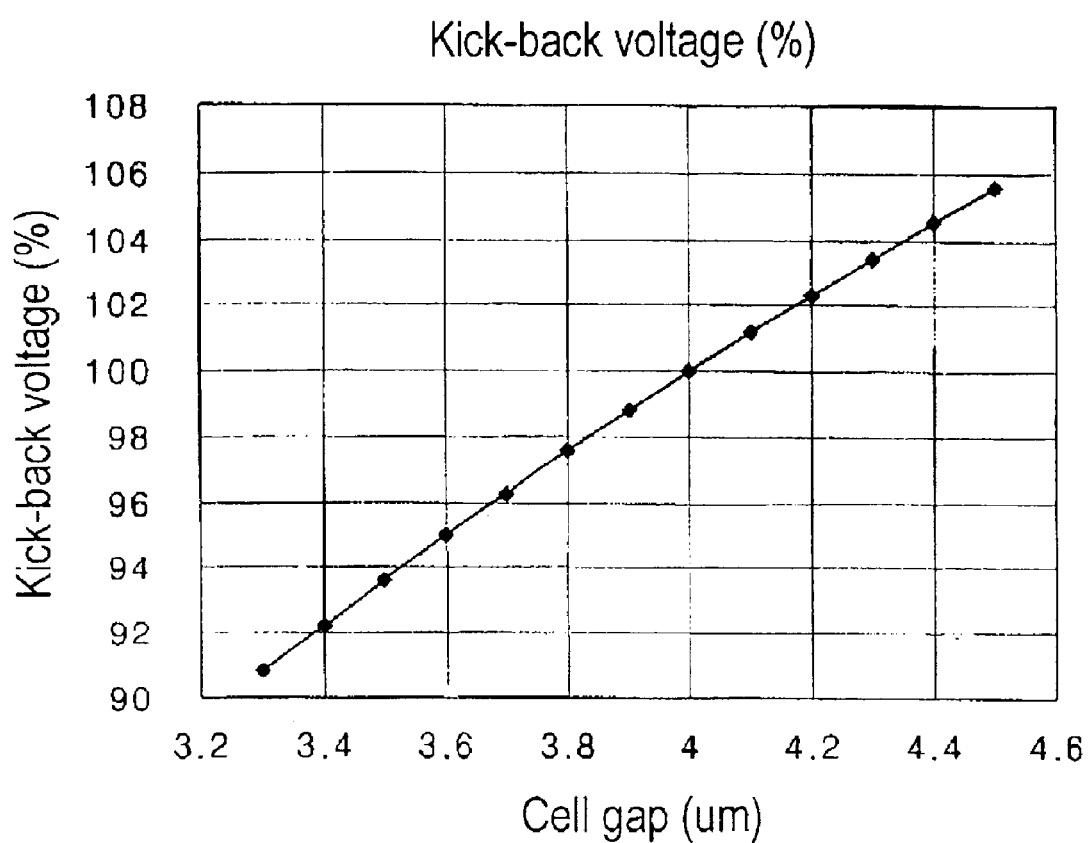
FIG. 1 is a graph illustrating variation in the kick-back voltage as a function of the cell gaps.

FIG. 1 is a graph illustrating variation in the kick-back voltage as a function of the multi cell gaps.

As shown in FIG. 1, with the LCD where the cell gap is differentiated, the greater the cell-gap is, the kick-back voltage becomes enlarged. This is because, as with the mathematical formula 1, the kick-back voltage varies depending upon the values of the liquid crystal capacity Clc or the storage capacity Cst.

In order to solve such a problem, the value of the denominator in the mathematical formula 1 should be the same irrespective of the liquid crystal capacity Clc. That is, in case the value of Clc+Cst reaches a predetermined value, the value of the denominator is maintained in a stable manner. Consequently, the value of the kick-back voltage is kept to be the same at any place.

In order that the value of Clc+Cst reaches a predetermined value, the value of the storage capacity Cst should be altered depending upon the cell gaps.

Figure 2:
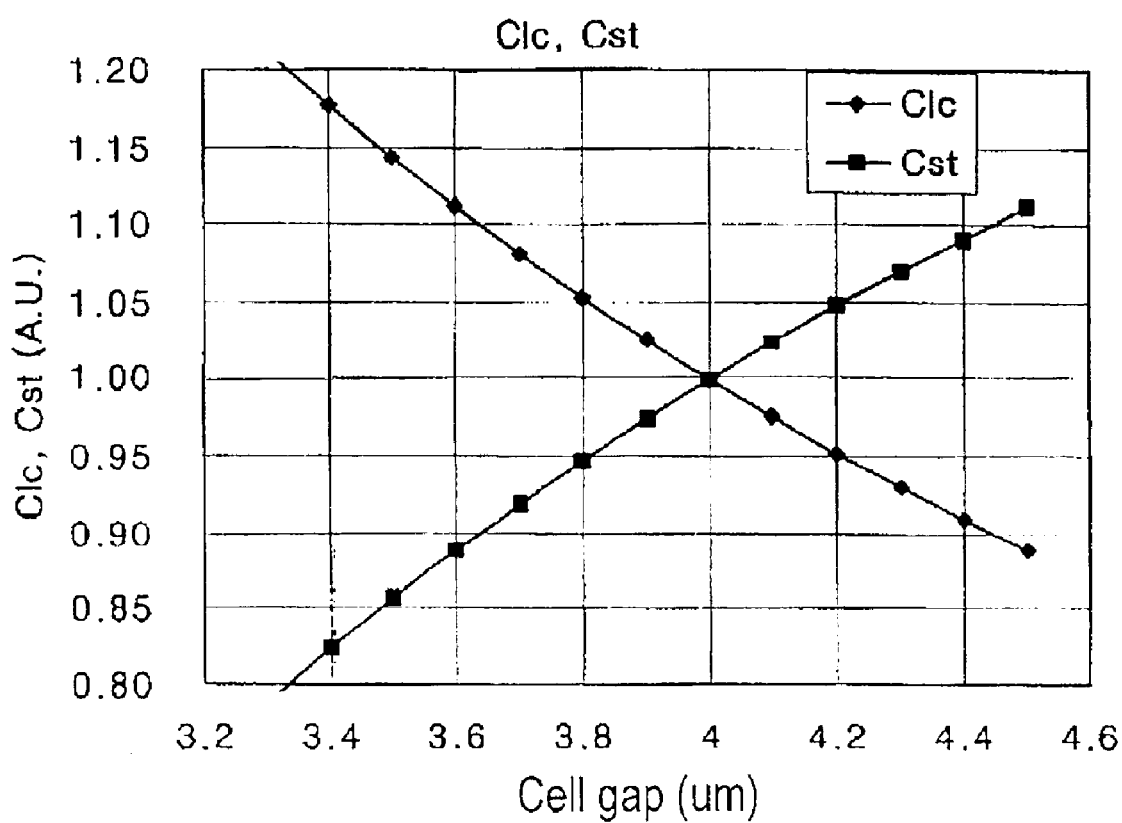
FIG. 2 is a graph illustrating variation in the liquid crystal capacity and the storage capacity as a function of the cell gaps.

FIG. 2 is a graph illustrating variation in the liquid crystal capacity Clc and the storage capacity Cst as a function of the multi cell gaps.

As known form the graph of FIG. 2, the values of the liquid crystal capacity Clc and the storage capacity Cst should be opposite to each other such that the sum thereof becomes to be a constant.

Therefore, with the multi-cell-gap structure, the storage capacity Cst of the pixels placed at the area where the cell gap is relatively small is established to be lower than that of the pixels placed at the area where the cell gap is relatively large.

Figure 3:
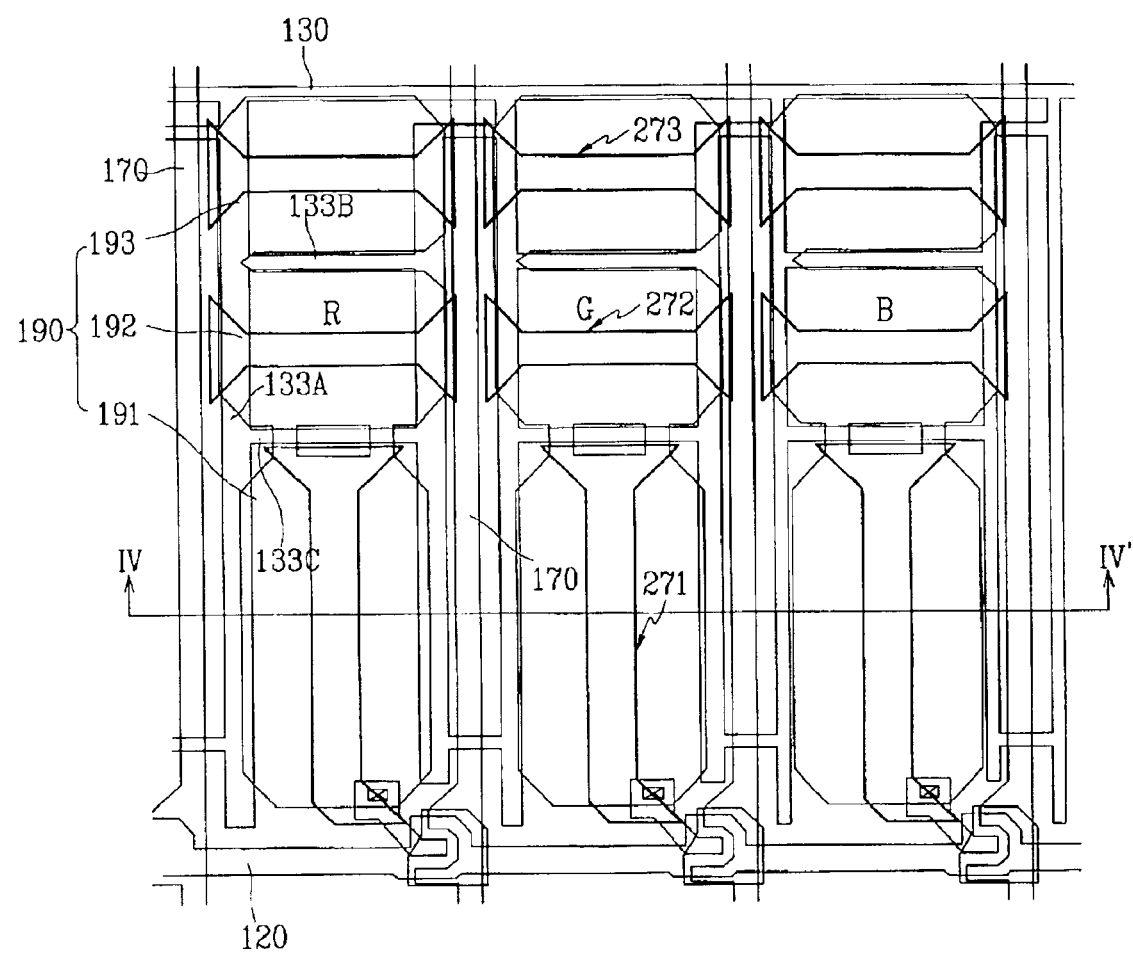
FIG. 3 is a sectional view of an LCD according to a first preferred embodiment of the present invention.
Figure 4:
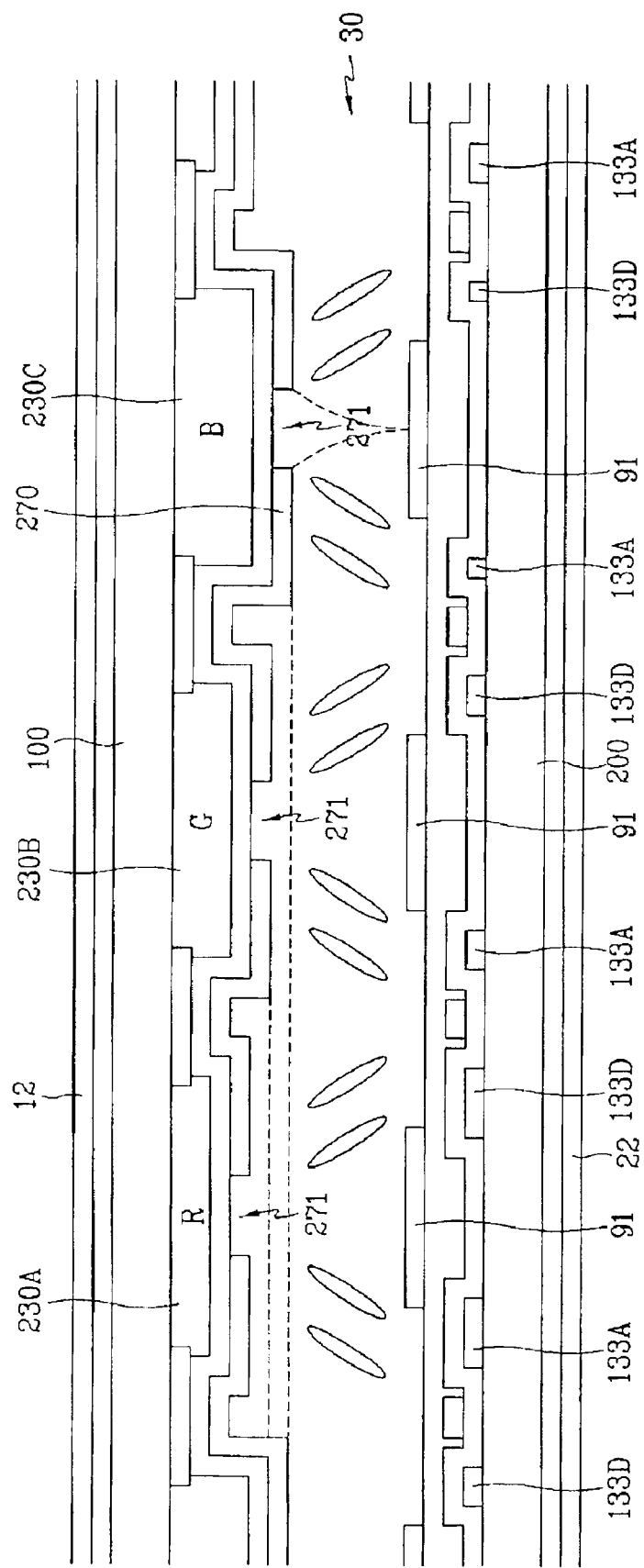
FIG. 4 is a cross sectional view of the LCD taken along the IV–IV' line of FIG. 3.

FIG. 3 is a sectional view of an LCD according to a first preferred embodiment of the present invention, and FIG. 4 is a cross sectional view of the LCD taken along the IV–IV' line of FIG. 3.

As shown in FIGS. 3 and 4, the LCD has a thin film transistor array panel 100, and a color filter array panel 200. A liquid crystal material 30 is injected between the two panels such that the directors of the liquid crystal molecules therein are aligned in a vertical manner. Two polarizing plates 12 and 22 are externally attached to the two panels 100 and 200 such that the polarizing axes thereof proceed perpendicular to each other.

When the two panels 100 and 200 are aligned to each other, micro portions 91 to 93 of the pixel electrode 190 of the thin film transistor array panel and first to third opening portions 271 to 273 of the common electrode 270 of the color filter array panel are overlapped with each other, thereby partitioning the pixel region into a plurality of micro domains. The respective micro portions 91 to 93 of the pixel electrode 190 are formed with two long sides and two short sides. The long sides of each micro pixel electrode portion proceed parallel to the data line 170 or the gate line 120 while being angled with respect to the polarizing axis of the polarizing plate by 45°. In case the long sides of the respective micro portions 91 to 93 of the pixel electrode 190 are positioned close to the data line 170 or the gate line 120, a storage line 130 or storage electrodes 133A, 133B, 133C and 133D are arranged between the data line 170 and the long side of the pixel electrode portion, or the gate line 120 and the long side of the pixel electrode portion.

Meanwhile, the injection of the liquid crystal material 30 is made between the common electrode 270 and the pixel electrode 190. In this preferred embodiment, as the RGB color filters 230A, 230B and 230C are differentiated in the thickness, the distance between the common electrode 270 and the pixel electrode 190 is also differentiated at the RGB pixel regions. That is, the cell gaps at the RGB pixel regions differ from each other. For example, the R cell gap at the R pixel region is the largest, the G cell gap at the G pixel region is smaller than the R cell gap, and the B cell gap at the B pixel region is the smallest. The B cell gap is smaller than the average value between the R cell gap and the G cell by $0.2 \pm 0.15$ $\mu$m.

With the LCD having a multi-cell-gap structure according to the first preferred embodiment of the present invention where the cell gaps at the RGB pixel regions differ from each other, the overlapping area between the pixel electrode and the storage electrode is controlled such that the storage capacity Cst can be varied depending upon the cell gaps.

That is, as shown in FIGS. 3 and 4, the overlapping area between the pixel electrode 91 and the storage electrodes 133A to 133D at the G pixel region with the relatively large cell gap is established to be larger than that at the B pixel region with the smallest cell gap, which is in turn established to be smaller than that at the R pixel region with the largest cell gap. In this way, the storage capacity Cst at the pixel region with the relatively large cell gap is established to be greater than that at the pixel region with the relatively small cell gap.

For instance, as shown in FIG. 2, the difference in the storage capacity Cst as a function of the cell gaps is established to be about $2.5\% \pm 1\%/0.1$ $\mu$m at the cell gap of about 4.0 $\mu$m. That is, in case the difference of 0.2 $\mu$m in the cell gap is made between the RGB pixel regions, it turns out that the difference of about 5% in the storage capacity Cst should be made.

With the first preferred embodiment, the sum of the liquid crystal capacity Clc and the storage capacity Cst is constantly maintained even at the multi-cell-gap structure. Consequently, the value of the kick-back voltage is kept to be the same at any place, thereby preventing occurrence of the flicker phenomenon. In this preferred embodiment, the overlapping area between the storage electrode and the pixel electrode is controlled over the entire panel area. Alternatively, the overlapping area between the storage electrode and the pixel electrode may be controlled by varying only the area of the storage electrode formed at the top panel or the bottom panel.

The flicker-free structure according to a second preferred embodiment of the present invention will be now explained in detail.

With the second preferred embodiment, the voltage applied to the liquid crystal is varied to control the liquid crystal capacity Clc, thereby differentiating the kick-back voltage.

Particularly, as the liquid crystal bears a property of dielectric anisotropy, the dielectric constant varies depending upon the directions of the directors of the liquid crystal molecules. Therefore, in case the voltage applied to the liquid crystal is varied, the value of the liquid crystal capacity Clc within the cell is altered.

Figure 5A:
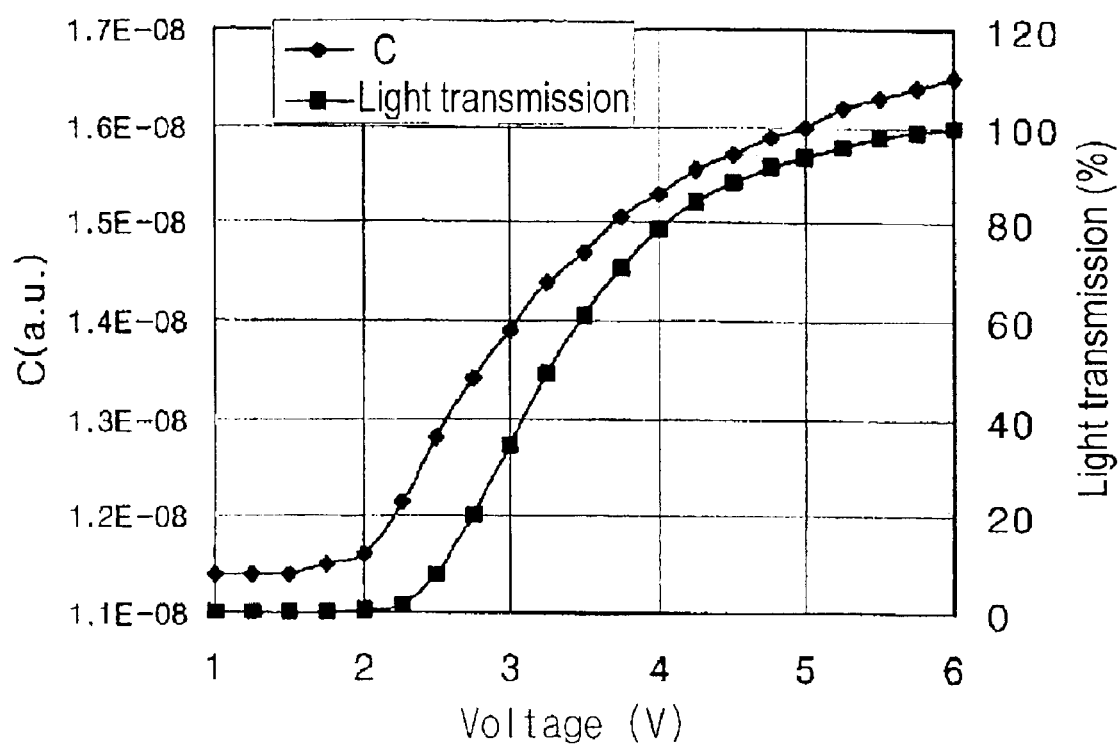
FIG. 5A is a graph illustrating variation in the light transmission and the capacity Clc of the liquid crystal as a function of the applied voltages.
Figure 5B:
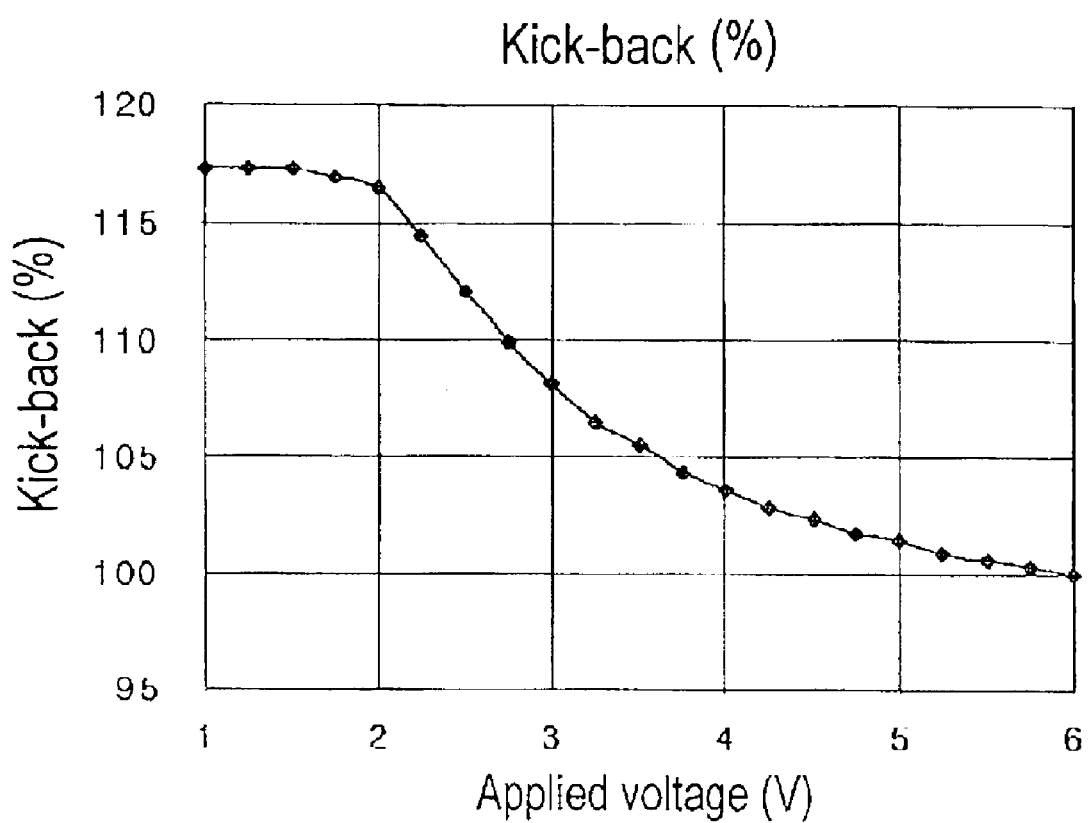
FIG. 5B is a graph illustrating variation in the kick-back voltage as a function of the applied voltages.

FIG. 5A is a graph illustrating the relation of the light transmission of the liquid crystal to the liquid crystal capacity Clc as a function of the applied voltages, and FIG. 5B is a graph illustrating variation in the kick-back voltage as a function of the applied voltages.

As shown in FIG. 5A, the higher the voltage applied to the liquid crystal is, the light transmission of the liquid crystal is increased together with the liquid crystal capacity Clc. Therefore, the liquid crystal capacity is varied depending upon the grays, and as a result, the kick-back voltage is also varied. As shown in FIG. 5B, the kick-back voltage can be varied by about 17% or more as a function of the applied voltages. The measuring is made in the case of a patterned vertically aligned (PVA) LCD. Therefore, the variation value of the kick-back voltage becomes enlarged with the case of an LCD bearing a high dielectric anisotropy, such as a twisted nematic (TN) LCD.

Figure 6:
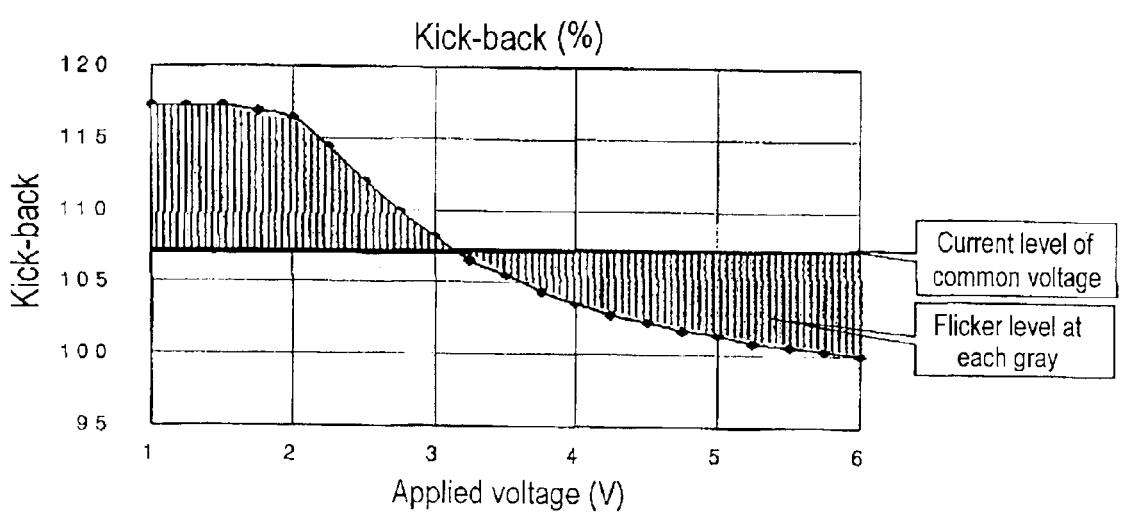
FIG. 6 is a graph illustrating the examples of flicker occurrence.

In order to correct such a kick-back voltage, the common voltage may be fixed to a predetermined value. In this case, any flicker is not made at that gray, but the flicker still occurs at other grays. FIG. 6 is a graph illustrating the examples of flicker generation. That is, as shown in FIG. 6, when the common voltage is fixed to a predetermined value, the area corresponding to the kick-back voltage does not involve any occurrence of a flicker, but the flicker occurrence becomes gradually increased as it goes to both lateral sides of that area.

In order to prevent such a flicker occurrence, with the second preferred embodiment of the present invention, the gray voltage is controlled such that the kick-back voltage is uniformly made at the respective grays.

Figure 7:
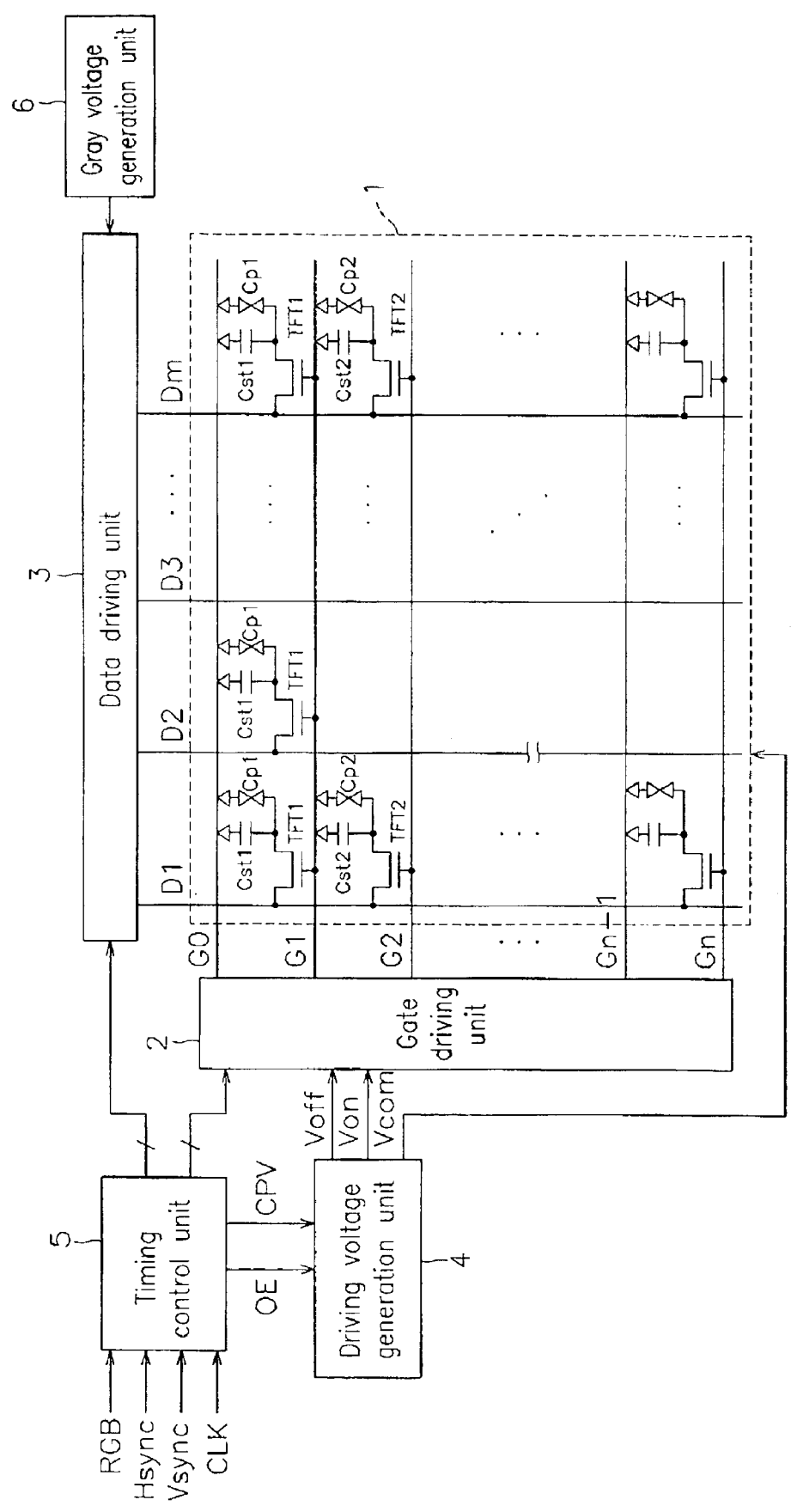
FIG. 7 is a block diagram of an LCD according to a second preferred embodiment of the present invention.

FIG. 7 illustrates the structure of an LCD according to the second preferred embodiment of the present invention.

As shown in FIG. 7, the LCD according to the second preferred embodiment of the present invention includes an LCD panel assembly 1, a gate driving unit 2, a data driving unit 3, a driving voltage generation unit 4, a timing control unit 5, and a gray voltage generation unit 6.

The data driving unit 3, called the "source driving unit," has a role of transmitting the voltages to the respective pixels within the LCD panel assembly 1 by one line. More specifically speaking, the data driving unit 3 stores the digital data from the timing control unit 5 at the shift resister in the data driving unit, and selects the voltages corresponding to the respective data upon receipt of the LOAD signals of ordering the transmission of the data to the LCD panel assembly 1 to transmit those selected voltages to the LCD panel assembly 1.

The gate driving unit 2, called the "scan driving unit," has a role of opening the passage of the data from the data driving unit 3 to the respective pixels. Each pixel of the LCD panel assembly 1 is switched on or off by way of the TFT.

The switching on/off operation of the TFT is made by applying a predetermined voltage Von or Voff to the gate.

The Von voltage for turning on the gate, and the Voff voltage for turning off the gate are generated at the driving voltage generation unit 4. The driving voltage generation unit 4 generates the Von and the Voff voltages as well as the Vcom voltages being the reference voltage for the data voltage difference within the TFT.

The timing control unit 5 generates digital signals for driving the data driving unit 3 and the gate driving unit 2. Specifically, the timing control unit 5 has a function of generating signals to be input into the driving units 2 and 3, controlling the timing of the data, and controlling the clock.

The gray voltage generation unit 6 generates gray voltages to be input into the data driving unit 3. Particularly with the second preferred embodiment, the gray voltage generation unit 6 generates the gray voltages such that the positive and the negative gray voltages are not symmetrical to each other per the respective grays, and transmits them to the data driving unit 3.

Figure 8:
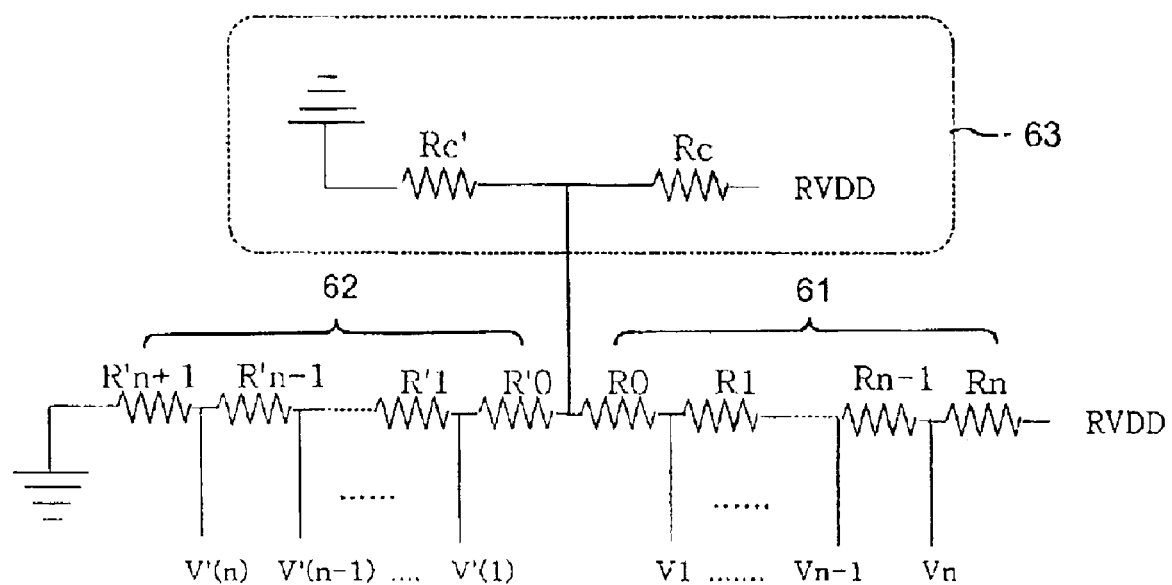
FIG. 8 illustrates the schematic structure of the gray voltage generation unit according to the second preferred embodiment of the present invention.

FIG. 8 schematically illustrates the structure of the gray voltage generation unit according to the second embodiment of the present invention.

As shown in FIG. 8, the gray voltage generation unit 6 includes a first resistance row 61 generating positive gray voltages, and a second resistance row 62 serially connected to the first resistances 61 to generate negative gray voltages.

In order to generate plural numbers of gray voltages for charging the liquid crystal in a positive manner, the first resistance row 61 has a plurality of resistances R0–Rn serially connected to each other between the first voltage applied from the outside and the reference voltage. The contact points between the first voltage RVDD and the respective resistances become to be the gray voltages V(1)–V(n).

In order to generate plural numbers of gray voltages for charging the liquid crystal in a negative manner, the second resistance row 62 has a plurality of resistances R'0–R'n+1 serially connected to each other between the reference voltage and the second voltage. The contact points between the reference voltage and the respective resistances become to be the gray voltages V'(1)–V'(n).

With this structure, in order that the positive gray voltage and the negative gray voltage with respect to one gray may bear asymmetrical values, the specific resistance Ri of the first resistance row 61 and the specific resistance Ri' of the second resistance row 62 should have different values. However, as it is not easy to control the values of resistances Ri and Ri' of the first and the second resistance rows 61 and 62 corresponding to each other, with this preferred embodiment, the reference voltage applied between the first and the second resistance rows 61 and 62 such that the positive gray voltage and the negative gray voltage with respect to one gray involves asymmetrical values.

For this purpose, with this second embodiment, a voltage control unit 63 is formed between the first and the second resistance rows 61 and 62 to generate a stable reference voltage, and supply the generated reference voltage thereto. The voltage control unit 63 is connected to the first and the second resistance rows 61 and 62 in a parallel manner.

The voltage control unit 63 includes first and second partial voltage resistances Rc and Rc' for partitioning the applied voltage, and supplying the reference voltage between the first and the second resistance rows 61 and 62. The first and the second partial voltage resistances Rc and Rc' have different values, and, for instance, are established to satisfy the mathematical formula 2.

$$Rc' > Rc \quad (2)$$

Therefore, the reference voltage becomes to be ((first voltage+second voltage)/2)+α. The value of α roughly amounts to the value of ½ to 3 times more than the value of Δkb (kick-back voltage at one gray–kick-back voltage at white gray).

Figure 9B:
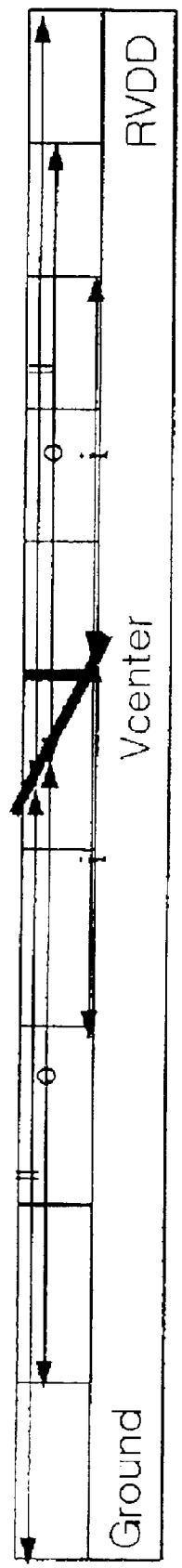
FIG. 9B illustrates the examples of gray voltage generation according to the second preferred embodiment of the present invention.

FIG. 9A illustrates the examples of gray voltage generation according to a prior art, and FIG. 9B illustrates the examples of gray voltage generation according to the second preferred embodiment of the present invention.

As shown in FIG. 9A, with the prior art, the voltage of ((first voltage+second voltage)/2) is applied as the reference voltage such that the plurality of gray voltages generated by the first and the second resistance rows 61 and 62 are symmetrical to each other.

However, with the second preferred embodiment of the present invention, as shown in FIG. 9B, the reference voltage of the first resistance row 61 and the second resistance row 62 for generating a plurality of gray voltages for the positive and negative charging of the liquid crystal is established to be larger than the voltage of ((first voltage+second voltage)/2) so that the plurality of gray voltages generated by the first and the second resistance rows 61 and 62 are not symmetrical to each other, but appear to be different per the respective grays.

Figure 10:
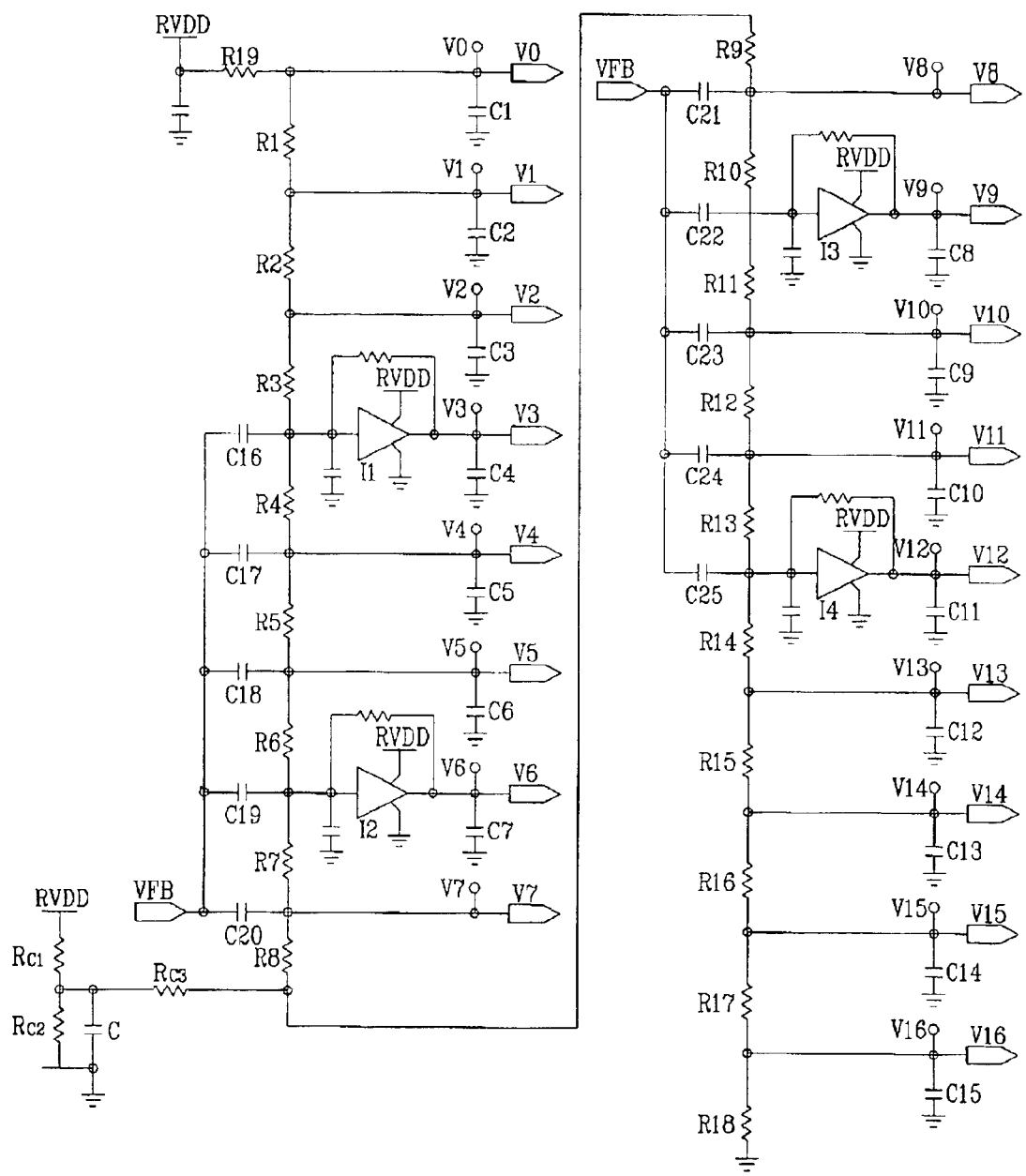
FIG. 10 is a specific circuit diagram of the gray voltage generation unit according to the second preferred embodiment of the present invention.

When a gray voltage generation unit practically applied to an LCD is made based on the above-described structure, the circuit shown in FIG. 10 is realized.

Specifically, the first resistance row 61 is formed with a plurality of resistances R0–R8 serially connected to each other. A plurality of positive gray voltages V0–V7 are output through the contact points between the respective resistances. For this purpose, capacitors C0–C7 are connected to the contact points between the respective resistances in a parallel manner. The first voltage RVDD applied from the outside is output as the voltage of V0, and the VFD voltage applied from the outside is output as the voltage of V7.

Furthermore, the second resistance row 62 is formed with a plurality of resistances R9–R18 serially connected to each other. A plurality of positive gray voltages V8–V16 are output through the contact points between the respective resistances. For this purpose, capacitors C8–C15 are connected to the contact points between the respective resistances in a parallel manner. The VFD voltage applied from the outside is output as the voltage of V8, and the voltage between the resistances R17 and R18 is output as the voltage of V16.

Meanwhile, the voltage control unit 63 includes first and second partial voltage resistances Rc1 and Rc2 serially connected to each other between the first voltage RVDD and the second voltage (for instance, earth voltage), a capacitor C connected to the contact point between the first and the second partial voltage resistances Rc1 and Rc2 in a parallel manner, and a resistance Rc3 connected to that contact point. The voltage between the first voltage AVDD and the second voltage is partitioned by way of the first and the second partial voltage resistances Rc1 and Rc2, and stored at the capacitor C. Then, the voltage stored at the capacitor C passes the resistance Rc3, and is applied to the contact point between the first and the second resistance rows 61 and 62 as the reference voltage. As the values of the first and the second partial voltage resistances Rc1 and Rc2 differ from each other, the voltage of ((first voltageRVDD+second voltage)/2) is applied as the reference voltage.

Therefore, the first resistance row 61 partitions the first voltage RVDD and the reference voltage applied from the voltage control unit 63 to generate a plurality of positive gray voltages V0–V7. The second resistance row 62 partitions the reference voltage and the second voltage to generate a plurality of negative gray voltages V8–V16. At this time, the positive gray voltages V0–V7 and the negative gray voltages V8–V16 are not symmetrical to each other with respect to the reference voltage.

Figure 11:
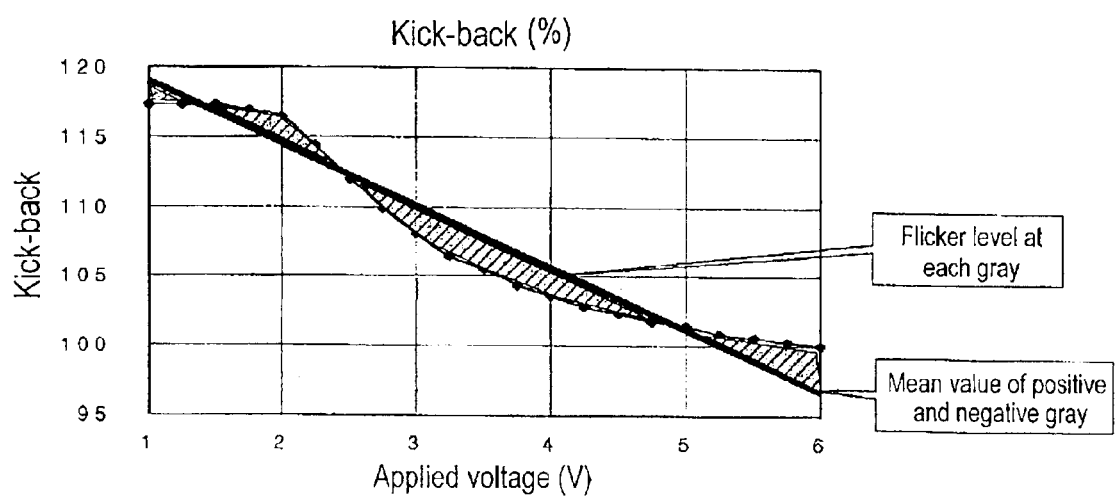
FIG. 11 is a graph illustrating the examples of flicker correction according to the second preferred embodiment of the present invention.

FIG. 11 illustrates the examples of flicker correction according to the second preferred embodiment of the present invention. With the second preferred embodiment, as shown in FIG. 11, the mean value of the positive and negative gray voltages is varied as it comes from the relatively low gray value to the relatively high gray value. That is, it is lowered with the high gray value, and heightened with the low gray value. When the rectilinear line indicating the variation in the above-identified mean value is expressed by the equation of (y=ax+b), the inclination degree a is determined by the value of the second partial voltage resistance Rc' of the voltage control unit 63, and the y intercept b is determined to be the common electrode voltage. That is, the second partial voltage resistance Rc' and the common electrode voltage are varied to thereby control the flicker occurrence made per the respective grays.

Even in the LCD where the kick-back voltage is differentiated per the respective grays, the possible flickers can be removed over the entire screen area with the structure according to the second preferred embodiment of the present invention.

Meanwhile, as shown in FIG. 6, the amount of kick-back voltage occurrence as a function of the applied voltages can be expressed by way of not a simple rectilinear line, but a much-distorted curve. With this case, in order to control the flicker occurrence more correctly, the variation in the mean value of the positive and negative gray voltages may be indicated by way of one or more rectilinear lines, for instance, three rectilinear lines each with a separate inclination degree, depending upon the distortion degrees thereof.

Figure 12:
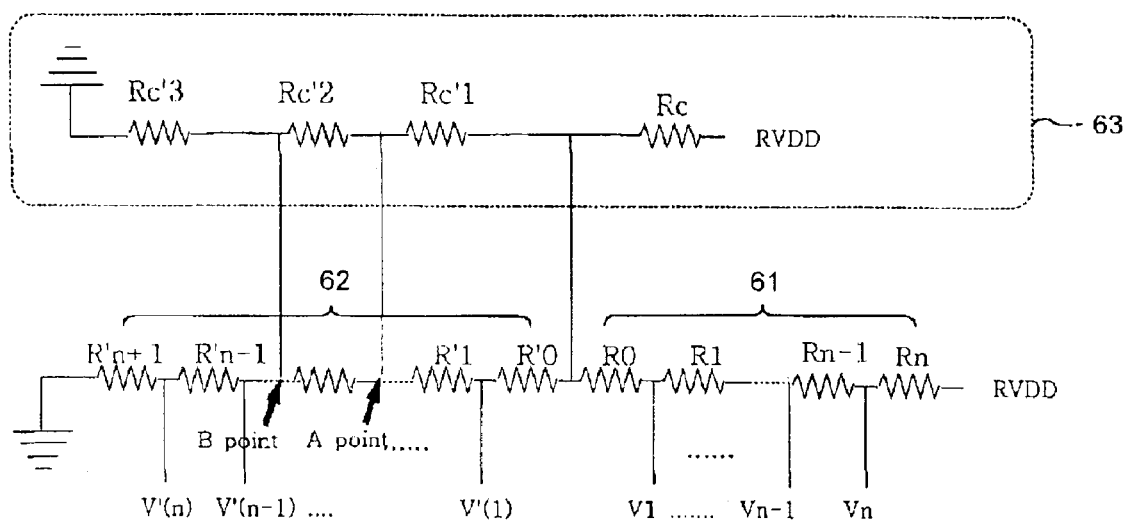
FIG. 12 illustrates the schematic structure of a gray voltage generation unit according to a third preferred embodiment of the present invention.
Figure 13:
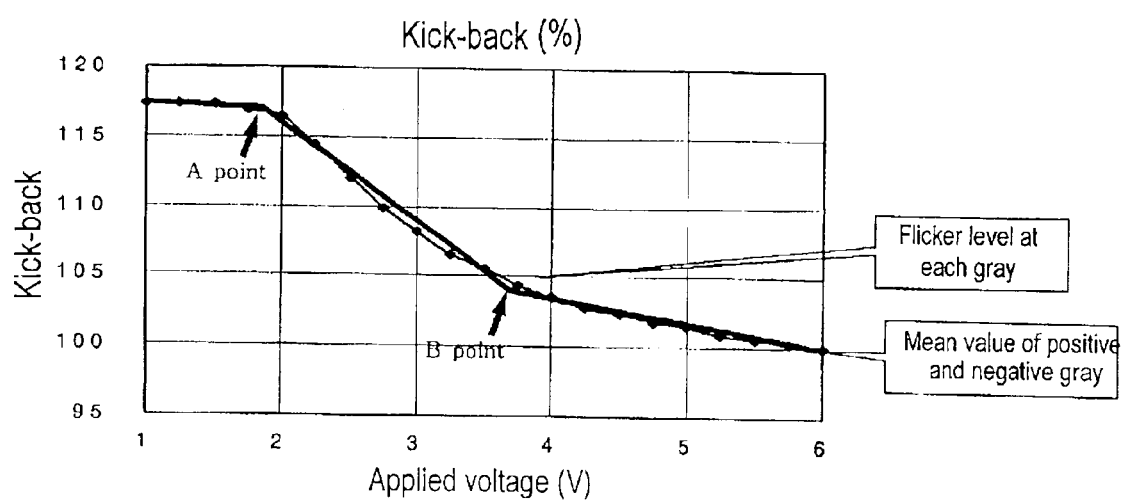
FIG. 13 is a graph illustrating the examples of flicker correction according to the third preferred embodiment of the present invention.

FIG. 12 illustrates the structure of a gray voltage generation unit according to a third preferred embodiment of the present invention, and FIG. 13 illustrates the examples of flicker correction according to the third preferred embodiment of the present invention.

In this preferred embodiment, as shown in FIG. 12, the first and the second resistance rows 61 and 62 are formed in the same manner as that related to the second preferred embodiment, but as differentiated from the second preferred embodiment, one or more reference voltages are generated at the voltage generation unit 63, and supplied to the contact points between arbitrary resistances of the first or the second resistance rows 61 or 62.

For this purpose, the voltage generation unit 63 includes three or more partial voltage resistances. In this preferred embodiment, four partial voltage resistances are serially connected to each other between the first voltage RVDD and the second voltage. A first reference voltage is generated through the contact point between the first partial voltage resistance Rc and the second partial voltage resistance Rc'1. A second reference voltage is generated through the contact point between the second partial voltage resistance Rc'1 and the third partial voltage resistance Rc'2. A third reference voltage is generated through the contact point between the third partial voltage resistance Rc'2 and the fourth partial voltage resistance Rc'3. The generated reference voltages are supplied to the first resistance row 61 or the second resistance row 62.

As shown in FIG. 12, the first reference voltage is supplied to the contact point between the first and the second resistance rows 61 and 62. The second and the third reference voltages are supplied to the contact point between arbitrary resistances of the second resistance row 62.

Therefore, as to the respective grays, the positive and the negative gray voltages generated at the first and the second resistance rows 61 and 62 according to the first reference voltage are not symmetrical to each other, and the plurality of negative gray voltages generated at the second resistance row 62 according to the second and the third reference voltages have different values.

Consequently, as shown in FIG. 13, three rectilinear lines with different inclination degrees are made to indicate the variation in the mean value of the positive and the negative gray values. In this case, Rc=Rc'1+Rc'2+Rc'3+α, and the values of the second to the fourth partial voltage resistances Rc'1, Rc'2 and Rc'3 are determined by the inclination degrees of the respective rectilinear lines shown in FIG. 13.

The portion of the second resistance row 62 receiving the second and the third reference voltages is varied depending upon the CV curve indicating the amount of the kick-back voltage occurrence as a function of the applied voltages.

Meanwhile, with this preferred embodiment, a plurality of reference voltages with different values are supplied to the second resistance row for generating the negative gray voltages such that the positive and the negative gray voltages have asymmetrical values. Alternatively, the first reference voltage with a specific value may be applied between the first and the second resistance rows such that a plurality of reference voltages with different values are applied to the first resistance row.

According to the second and the third embodiments, the asymmetrical positive and negative gray voltages can be generated in a desirable manner even when the resistance value of the existent gray voltage generation unit is not varied.

As described above, with the LCD where the kick-back voltage is differentiated per the respective grays, the possible flickers can be corrected in a uniform manner. In this way, the picture quality of the LCD can be improved.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display, comprising:
   a first panel;
   a second panels facing the first panel;
   a liquid crystal cell formed between the first panel and the second panel and having a plurality of cell gaps;
   a pixel electrode formed at one of the first panel and the second panel;
   a common electrode formed at one of the first panel and the second panel;
   a storage electrode formed at one of the first panel and the second panel;
   a liquid crystal capacitance formed between the pixel electrode and the common electrode; and
   a storage capacitance formed between the pixel electrode and the storage electrode and varied by the cell gaps,
   wherein a pixel with a relatively small cell gap has the storage capacitance smaller than that of a pixel with a relatively large cell gap.

2. A liquid crystal display, comprising:
a first panel;
a second panels facing the first panel;
a liquid crystal cell formed between the first panel and the second panel and having a plurality of cell gaps;
a pixel electrode formed at one of the first panel and the second panel;
a common electrode formed at one of the first panel and the second panel;
a storage electrode formed at one of the first panel and the second panel;
a liquid crystal capacitance formed between the pixel electrode and the common electrode; and
a storage capacitance formed between the pixel electrode and varied by the cell gaps,
wherein a sum of the liquid crystal capacitance and the storage capacitance is uniform among pixels.

* * * * *